United States Patent
Chang

(10) Patent No.: US 6,884,360 B2
(45) Date of Patent: Apr. 26, 2005

(54) FILTRATION DEVICE WITH CROSS-FLOW FUNCTION AND ITS FILTRATION METHOD

(76) Inventor: Sei-Chang Chang, No. 544-16, Chung-Cheng Rd., HsinChuang, Taipei (TW)

(*) Notice: Subject to any disclaimer, the term of this patent is extended or adjusted under 35 U.S.C. 154(b) by 0 days.

(21) Appl. No.: 10/612,166

(22) Filed: Jul. 3, 2003

(65) Prior Publication Data
US 2005/0000919 A1 Jan. 6, 2005

(51) Int. Cl.⁷ ............................................. B01D 37/00
(52) U.S. Cl. .................... 210/767; 210/808; 210/248; 210/433.1; 210/456
(58) Field of Search ................ 210/767, 790, 210/808, 248, 304, 356, 409, 433.1, 434, 456, 512.1

(56) References Cited

U.S. PATENT DOCUMENTS 3,725,271 A * 4/1973 Giannotti ................... 210/767
6,461,513 B1 * 10/2002 Jen ............................ 210/650

* cited by examiner

Primary Examiner—Robert James Popovics
(74) Attorney, Agent, or Firm—Troxell Law Office, PLLC

(57) ABSTRACT

The present invention employs cross-flow to extend operation time of filtration devices and to increase filtration efficiency. The filtration device with cross-flow function consists of a filter, a case for containing the filter and a diffuser. There are an inlet and an outlet set on the case. The diffuser is set inside the filter along longitudinal direction. The diffuser consists of a reducing section, a throat section and a flared section for producing cross-flow so as to prevent the impurities and particles in the fluid to form cake on the inner surface of filter, so the operation time is therefore greatly increased. A drain outlet is set for adjusting the impurities and particles concentrations of the fluid inside the filter for further extending the effective operation time.

6 Claims, 3 Drawing Sheets

FILTRATION DEVICE WITH CROSS-FLOW FUNCTION AND ITS FILTRATION METHOD

BACKGROUND OF THE INVENTION

1. Field of the Invention

This invention relates to a filtration device with cross-flow function and its filtration method, more particularly, to a filtration device that employs cross-flow to prevent the formation of cake on the filter.

2. Description of the Related Art

Since particles have been derived by technology improvements and environmental awareness, the quality of supply liquids and the treatment of waste liquids for all applications have become more and more stringent. Filtration is one of the most important processes in liquid treatments and plays a major role in fulfilling these requirements and regulations.

A known filtration devices (see FIG. 1) consists of a filter 1 containing a cylindrical case 2 which has an inlet 21 and an outlet 22. The fluid being filtered enters via the inlet and flows through the filter 1, which removes and retains larger particles passing trough the openings of the filter, but allows the "carrier" fluid (the filtrate). The filtrate then leaves via the outlet 22.

Obviously, the effective filtering area of this device is larger than inlet area. Thus, the speed of flow through filter is much slower than that in the inlet, and the direction of the flow through the filter 1 is perpendicular to the surface of filter. This situation results impurities, formation of a cake and blocking on the openings of the filter, whereby the effective filtration area is reduced. When the effective area of filter becomes smaller than inlet area, the differential pressure ($\Delta P$) between inlet 21 and outlet 22 increases. For typical applications, there is a maximum pressure drop allowed for the filtration device, and when $\Delta P$ reaches the maximum value, it is required to shut down the whole process to change or clean the filter by removing the cake formed on the surfaces, or to switch to different operation to avoid interrupting.

FIG. 2 shows the relationship of operation time against pressure drop across filtration devices. At the beginning of a filtration operation, the pressure drop is almost constant as long as the effective filtration area is larger than the cross-sectional area of the inlet. The effective filtration area will gradually reduce due to the formation of cake on the filter surface, in which cake blocks the openings of the filter. When the effective filtration area becomes smaller than the cross-sectional area of the inlet, the pressure drop across the filter device will suddenly increase, and quickly exceed the maximum value of the device, and action should be taken to maintain normal operation. FIG. 2a shows the relationship for the device of FIG. 1 in the prior art.

To avoid shortcoming in the prior art, the inventor has studied and provided a logical method to improve prior art effectively.

SUMMARY OF THE INVENTION

The main objective of the present invention is to provide a method for producing cross-flow to extend the operation time of a filtration device and to improve filtration efficiency. Accordingly, the invention provides a filtration method with cross-flow function, the method comprising:

(a) providing a filtration device having a case, a filter and a diffuser, the case having an inlet and an outlet, and the diffuser having a tapered section, a throat section and a flared section;

(b) flowing fluid into the inlet, and through the tapered section of the diffuser for producing a local low-pressure whereby fluid outside the diffuser is entrained into the tapered section, and then through the throat section;

(c) flowing fluid continuously through the flared section gradually to decrease flow velocity and thus converting kinetic energy into pressure energy to form a local high-pressure region at an exit of the diffuser; and (d) passing the fluid to exit from the diffuser through a passage formed by an outer surface of the diffuser and an inner surface of the filter, whereby the fluid is entrained back into the tapered section, to form the circulating cross-flow.

The second objective of the present invention is to provide a filtration device with cross-flow function. The device comprises a case having an inlet and an outlet, in which fluid directly flows into the case through the inlet and flows out from the outlet, and a diffuser positioned within the filter and set along a longitudinal direction, the diffuser having at least one support connected to the case adjacent to the inlet to cause cross-flow circulating inside the filter to prevent the formation of cake on the surface of the filter, and the diffuser having a tapered section, a throat section and a flare section.

The fluid coming out from the inlet of the filter enters the tapered section of the diffuser, flows through the throat section and the flared section, and then along a passage formed between the outer surface of the diffuser and the inner surface of the filter, and finally circulates back to the tapered section of the diffuser. Thus, a cross-flow on the surface of filter is formed. Impurities and particles in the fluid are then evenly distributed inside the filter by the circulating cross-flow, which prevents the accumulation of impurities and particles on the surface of the filter, and extends the effective operation time of the filtrating devices.

In a preferred embodiment, the case includes a drain outlet for adjusting impurity and particle concentrations of the fluid inside the filter. Preferably, a drain valve is an electromagnetic valve.

For your esteemed review committee members to further understand and recognize the object, the characteristic and the function of the present invention, a detailed description with corresponding diagrams are presented as follow drawings.

DESCRIPTION OF THE PREFERRED EMBODIMENTS

The present invention relates to a filtration device with cross-flow function and to a filtration method, especially to a filtration device which uses cross-flow to prevent cake formation in a filter. The structure of the present invention is simple, and it has two advantages: increasing effective operation time and continuous filtration operation without interruption.

According to Darcy's Law, which is $$J=(1/A)(dV/dt)=\{\Delta p/[\eta\times(Rm+Rc)]\}$$

where J is the permeate flux; A is effective surface area of filter, t is the filtration time; Δp is the differential pressure across the cake and the filter, η is the viscosity of the permeate; Rm is the resistance of the filter; and Rc is the resistance of cake. Thus, the permeate flux is proportional to the reverse of the sum of the resistance of the filter and the resistance of the cake. Another equation:

$$J = c\gamma^n a^m \psi^p L^q \eta_0^r$$

where J is the permeate flux; c is a coefficient; y is the shear rate; a is the solid particle size; ψ is solid volume fraction in the suspension; L is the filter length; $\eta_0$ is viscosity of the suspension; and n, m, p, q and r are parameters. Because n is positive, the permeate flux is proportional to the shear rate. To conclude, a higher shear rate of the fluid on the filter surface gives a higher permeate flux due to the retardation of cake formation.

Figure 1:
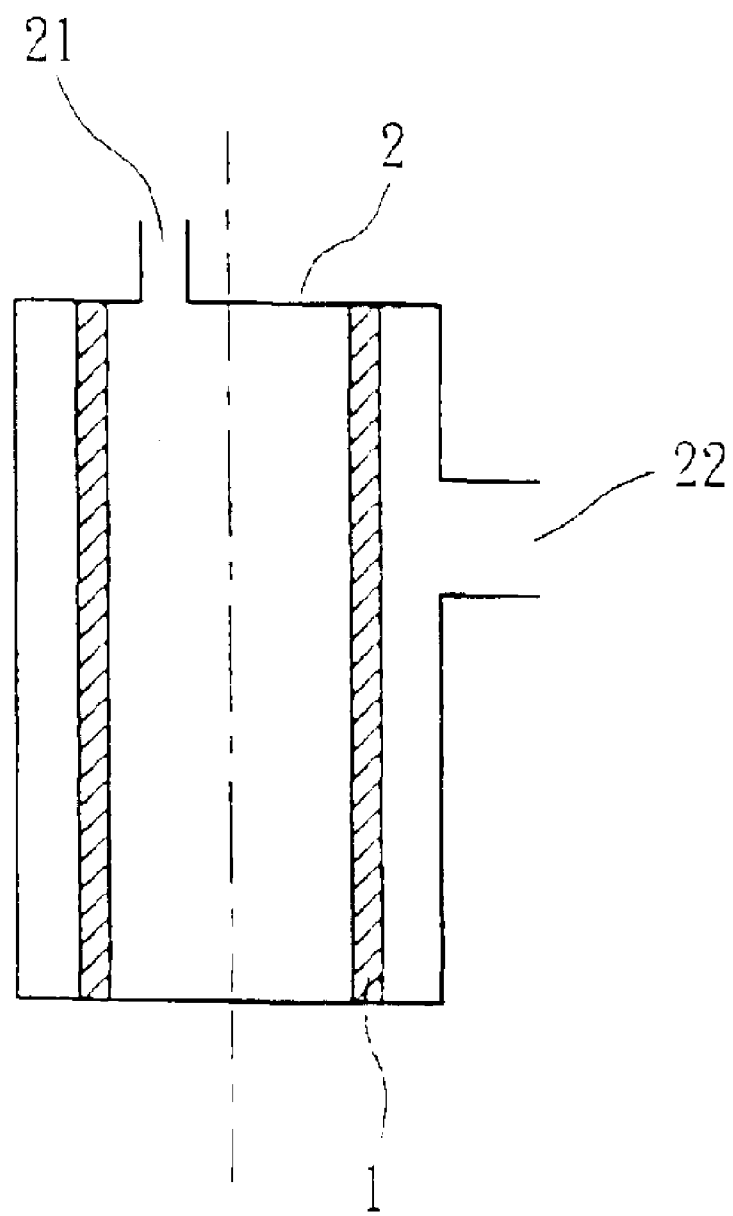
FIG. 1 is a diagram showing the sectional view of a prior filtration device.
Figure 2:
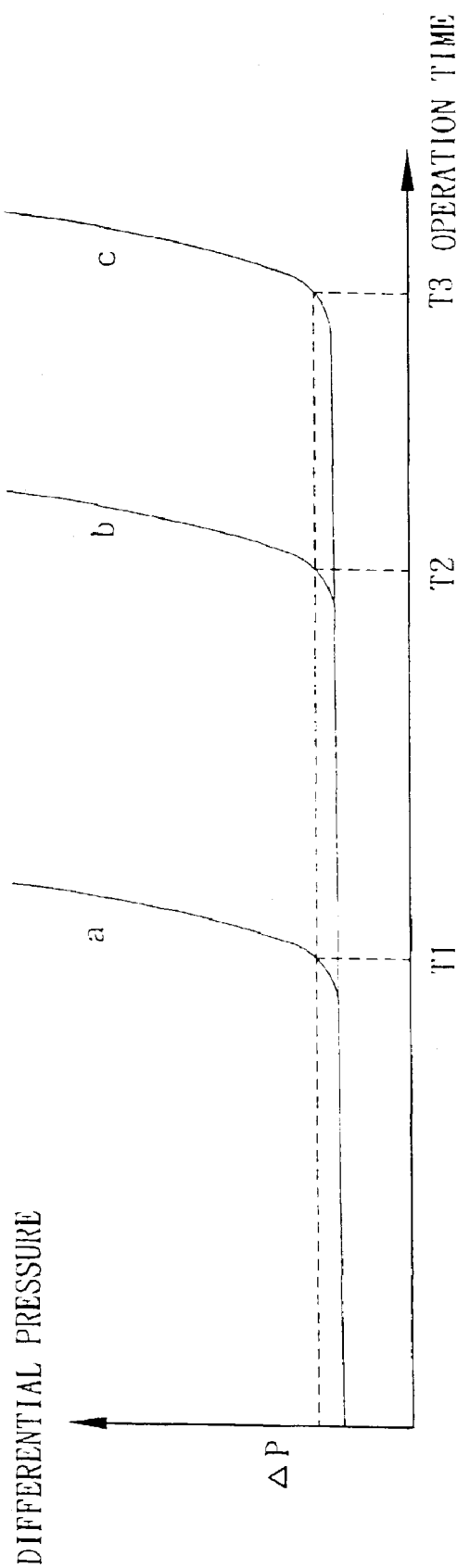
FIG. 2 shows the relationship scheme of the operation time and the differential pressure between the inlet and the outlet of different filtration devices.
Figure 3:
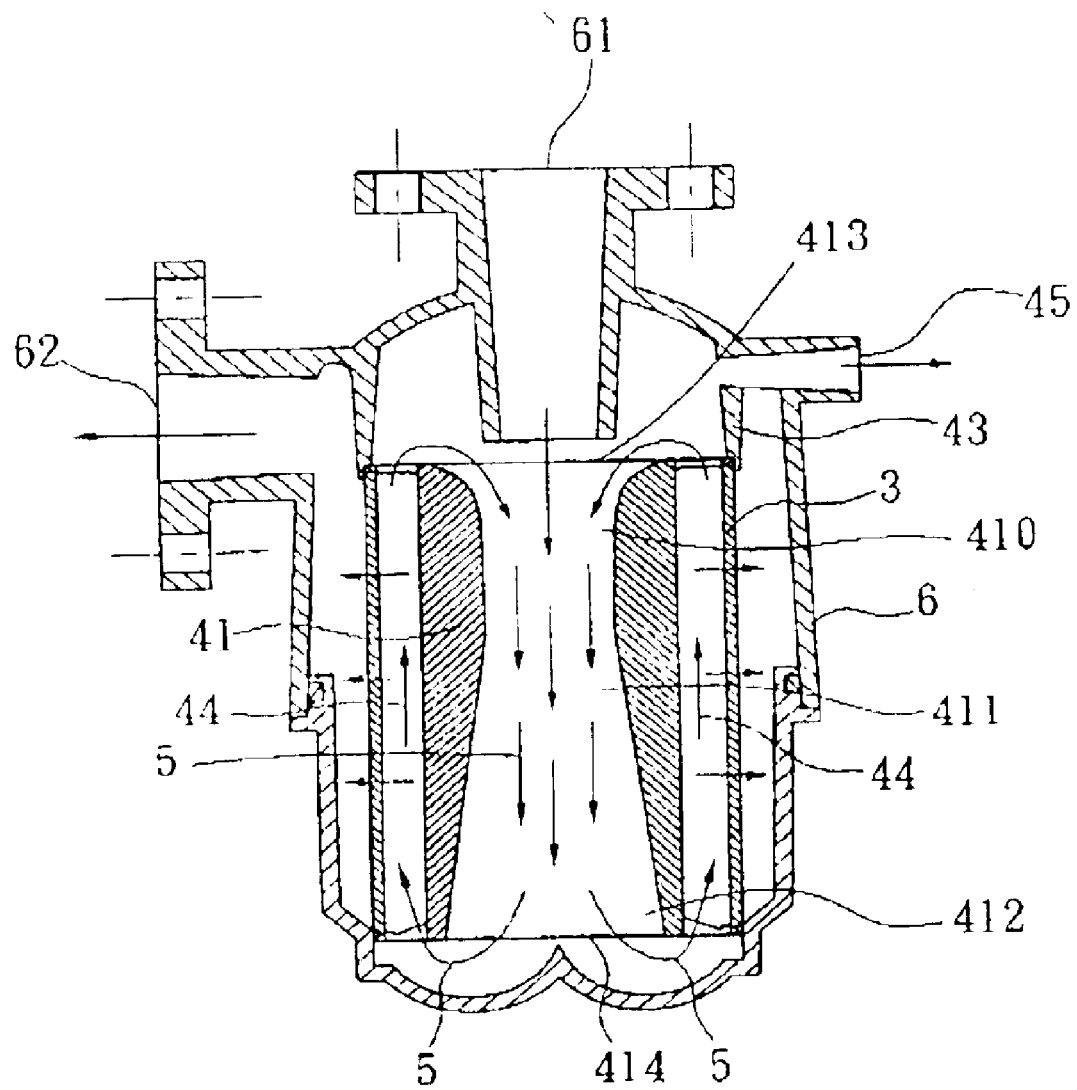
FIG. 3 is a diagram showing the sectional view of a embodiment of the invention.

FIG. 3 is a diagram showing the sectional view of an embodiment of the invention. The filtration device consists of a filter 3, a diffuser 41 and a case 6, and the filter 3 is contained within the case 6. The case 6 has an inlet 61 and an outlet 62 set on the top and one side respectively. Liquid display enters into the diffuser 41 provided inside the filter 3 via the inlet 61, and the permeate goes out from the outlet 62. The diameter of the diffuser 41 is smaller than that of the filter 3, and the diffuser 41 is installed inside the filter 3 along a longitudinal direction. The top of the diffuser 41 is provided with a plurality of supporters 43 for supporting the diffuser 41, and the outer surface of the diffuser 41 and the inner surface of filter 3 form a passage 44 for liquid flowing through an outlet 414 on the bottom of diffuser 41 then to an inlet 413 on the top of diffuser 41. The circulating flow then creates a cross-flow 5 on the inner surface of filter 3, and prevents cake formation on the filter 3. The diffuser 41 consists of a tapered section 410, a throat section 411 and a flared section 412, whereby the tapered section 410 corresponds to the inlet 61 of the case 6, whereby liquid can enter into tapered section 410 via the inlet 61 and then pass through throat section 411 to flared section 412. The fluid flows through the tapered section and produces a local low-pressure section. Thus, the liquid outside the diffuser 41 is entrained into the diffuser 41 from the inlet 413 of the diffuser 41 and through the throat section 411 to the outlet 414 of the diffuser 41. When liquid enters the flared section 412, the kinetic energy of the liquid is transferred to pressure energy, and a local high-pressure region is formed at the bottom of the flared section 412. The local low-pressure and the local high-pressure regions at the inlet 61 and the outlet 62 of the diffuser 41 produce the cross-flow 5, which results in a much larger shear rate for effectively disturbing impurities and particles in the liquid. Thus, the impurities and particles are evenly distributed in the liquid inside the filter 3, and do not form a cake on the surface of the filter 3. Thus the filter operation time can be extended due to the low-pressure drop without forming cake on the filter surface (as shown in FIG. 2b).

Although the device described above prevents the formation of cake and increases effective operation time, the concentration of impurities and particles still increase and eventually the filtration efficiency will decrease.

The filtration device of the present invention has the following advantages:

1. It is simple, and is suitable for all applications for all conventional filtration devices.
2. Impurities and particles are prevented from accumulation, and the operation time of filtration device is extremely extended.
3. The gap between the diffuser and the inner surface of the filter can be adjusted to achieve the best performance of the system.
4. Operation time can be further extended by adding a drain outlet (45) and a drain valve to keep continuous filtration operation.

The above descriptions are the preferable embodiments of the present invention. The covered scopes of the present invention are not restricted on the embodiments shown in the present invention. All the changes according to the contents of the present invention, the generated functions and characteristics similar to those of the embodiments of the present invention and any ideas thought by the persons well-known such technologies are all within the scopes of the present invention.

What claimed is:

1. A filtration device with a cross-flow function comprising:
   a) a case having:
      i) a case inlet;
      ii) a case outlet; and
      iii) at least one support;
   b) a filter located in the case;
   c) a diffuser located on an interior of the filter and having:
      i) a diffuser inlet, an end of the diffuser adjacent to the diffuser inlet being located adjacent to each of the at least one support;
      ii) a diffuser outlet;
      iii) a throat section located on an interior thereof between the diffuser inlet and the diffuser outlet;
      iv) a tapered section located on an interior thereof between the diffuser inlet and the throat section; and
      v) a flared section located between the located on an interior thereof between the throat section and the diffuser outlet; and
   d) a passage formed between an exterior of the diffuser and an interior of the filter communicating with the diffuser outlet and the diffuser inlet, such that the cross-flow function includes liquid flowing from the diffuser outlet, through the passage, and into the diffuser inlet.

2. The filtration device with cross-flow function of claim 1, wherein the inlet includes a nozzle for accelerating flow velocity into the diffuser.

3. The filtration device with cross-flow function of claim 1, wherein the case includes a drain outlet for adjusting impurity and particle concentrations of the fluid inside the filter.

4. A filtration method with cross-flow function, which comprises the steps of:
   a) providing a case having a case inlet, a case outlet, and at least one support;
   b) positioning a filter in the case;
   c) positioning a diffuser on an interior of the filter with the diffuser having a diffuser inlet located on an end of the diffuser adjacent to each of the at least one support, a diffuser outlet, and a throat section, a tapered section, and a flared section located on an interior thereof between the diffuser inlet and the diffuser outlet;
   d) forming a passage between an exterior of the diffuser and an interior of the filter communicating with the diffuser outlet and the diffuser inlet, such that the cross-flow function includes liquid flowing from the diffuser outlet, through the passage, and into the diffuser inlet;
   e) moving fluid from the diffuser inlet into the tapered section to produce a local low-pressure and entraining fluid flowing outside the diffuser into the tapered section, and then through the throat section;

f) moving fluid from the throat section into the flared section gradually decreasing flow velocity and converting kinetic energy into pressure energy to form a local high-pressure region at the diffuser outlet; and g) moving fluid from the diffuser through the passage and entraining fluid back into the tapered section to form the circulating cross-flow.

5. The filtration method with cross-flow function of claim 4, wherein the inlet is a nozzle for accelerating fluid flow velocity.

6. The filtration method with cross-flow function of claim 4, wherein the case includes a drain outlet for adjusting the concentration of impurity and particle concentrations of the fluid inside the filter.

* * * * *